United States Patent
Edgren (10) Patent No.: US 9,528,853 B2
(45) Date of Patent: Dec. 27, 2016

(54) METHOD AND SYSTEM FOR DISPLAYING A REPRESENTATION OF A DRIVING PATTERN OF A VEHICLE

(71) Applicant: VOLVO CAR CORPORATION, Gothenburg (SE)

(72) Inventor: Claes Edgren, Trollhattan (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/885,150

(22) Filed: Oct. 16, 2015

(65) Prior Publication Data

US 2016/0116300 A1    Apr. 28, 2016

(30) Foreign Application Priority Data

Oct. 28, 2014 (EP) ..................... 14190595

(51) Int. Cl.
*G01C 21/36* (2006.01)
*B60W 50/14* (2012.01)
(Continued)

(52) U.S. Cl.
CPC ........... *G01C 21/3697* (2013.01); *B60K 35/00* (2013.01); *B60K 37/00* (2013.01); *B60R 16/0236* (2013.01);
(Continued)

(58) Field of Classification Search
CPC . G01C 21/36; G01C 21/3697; G01C 21/3676; B60R 16/0236; B60W 50/14; B60K 35/00; B60K 37/00
(Continued)

(56) References Cited

U.S. PATENT DOCUMENTS 4,281,567 A * 8/1981 Maurer ................. B60W 10/06
477/110
5,913,917 A    6/1999 Murphy
(Continued)

FOREIGN PATENT DOCUMENTS

EP    2497672    9/2012
FR    2976888    12/2012

OTHER PUBLICATIONS

Extended European Search Report for European Application No. 14190595.0, Completed by the European Patent Office, Dated May 6, 2015, 4 Pages.

*Primary Examiner* — Tan Q Nguyen
(74) *Attorney, Agent, or Firm* — Brooks Kushman P.C.

(57) ABSTRACT

A method is disclosed for displaying a representation of a driving pattern of a vehicle. The method may include determining the driving pattern in the form of a condition involving excess fuel consumption of the vehicle, and displaying a representation of the excess fuel consumption on a display unit in the vehicle. The method may further include providing first input data related to an actual speed of the vehicle travelling along a route, providing second input data related to a reference speed for the route, calculating, based on the first and second input data, a measure of the excess fuel consumption as a result of the actual speed exceeding the reference speed, and presenting, on the display unit, the representation of the excess fuel consumption. A system is also disclosed for displaying a representation of a driving pattern of a vehicle.

14 Claims, 3 Drawing Sheets

(51) Int. Cl.
*B60K 35/00* (2006.01)
*B60K 37/00* (2006.01)
*B60R 16/023* (2006.01)

(52) U.S. Cl.
CPC .......... *B60W 50/14* (2013.01); *G01C 21/3676* (2013.01); *B60K 2350/1092* (2013.01); *B60W 2520/10* (2013.01); *B60W 2550/40* (2013.01)

(58) Field of Classification Search
USPC .......... 701/123, 110, 86; 340/439; 705/14.1
See application file for complete search history.

(56) References Cited

U.S. PATENT DOCUMENTS

| | | |
|---|---|---|
| 8,793,054 B2 | 7/2014 | Sjogren et al. |
| 2004/0020283 A1* | 2/2004 | Minami ................ B60W 10/06 73/115.02 |
| 2011/0148618 A1 | 6/2011 | Harumoto et al. |
| 2011/0172871 A1 | 7/2011 | Hall et al. |
| 2014/0203927 A1* | 7/2014 | Petit ................... B60R 16/0236 340/439 |

* cited by examiner

METHOD AND SYSTEM FOR DISPLAYING A REPRESENTATION OF A DRIVING PATTERN OF A VEHICLE

CROSS-REFERENCE TO RELATED APPLICATIONS

This application claims priority to European Patent Application No. EP 14190595.0 filed on Oct. 28, 2014, the disclosure of which is incorporated in its entirety by reference herein.

TECHNICAL FIELD

The disclosure relates to a method for displaying a representation of a driving pattern of a vehicle, said method comprising: determining said driving pattern in the form of a condition involving excess fuel consumption of said vehicle, and displaying a representation of said excess fuel consumption on a display unit in said vehicle.

The disclosure also relates to a system for displaying a representation of a driving pattern of a vehicle, comprising a central processing unit configured for determining said driving pattern in the form of a condition involving excess fuel consumption of said vehicle; and a display unit displaying a representation of said excess fuel consumption.

The disclosure can be used in different types of vehicles such as cars, trucks, buses, motorcycles and other forms of vehicles.

BACKGROUND

In the field of vehicles, there are high requirements as regards the information which is necessary for a driver of a vehicle. For many years, road vehicles have been equipped with an instrument panel comprising, for example, a speedometer, a tachometer, an odometer, an oil pressure gauge, a fuel gauge, and also warning lights and indicators of different types.

In recent years, there has been an increased focus on environmental issues in the field of vehicle technology. For this reason, there is a need to provide selective information to a driver of a vehicle in order to allow the driver to make well-founded decisions regarding the driving pattern. In this manner, the driver will be able to drive the vehicle in a manner which takes environmental demands into account. In this regard, a factor is the fuel consumption of the vehicle, which can be influenced by the driving pattern and which has great impact on the environmental burden caused by the vehicle.

In order to solve the above-mentioned problem and present relevant information to the driver, there exist solutions involving indicators and instruments which may assist a driver in operating a vehicle in an environmental-friendly manner. For example, there exist indicators which are used for displaying information to the driver which indicate whether the vehicle is operated in an optimum manner as regards fuel economy.

The patent document U.S. Pat. No. 8,793,054 discloses a system for indicating a vehicle fuel efficiency for various patterns of vehicle usage. The system analyzes vehicle usage patterns to determine whether the vehicle is operated in a fuel efficient manner. The system is furthermore arranged for notifying a driver of an indication of a vehicle fuel efficiency which is calculated for a vehicle usage pattern, for example if an excess of fuel is consumed due to an inefficient usage pattern.

Although the above-mentioned system may assist a driver in order to drive a vehicle in a fuel-efficient manner, there is still a need for further improvements in this field of technology so that a driver of a vehicle can be supplied with relevant information in order to make well-founded decision regarding the vehicle driving pattern.

SUMMARY

Consequently, an object of the disclosure is to provide a method which solves the above-mentioned problems related to prior art and provides a solution which gives the driver of a vehicle improved and more useful information related to environmental issues, in particular relating to the fuel-efficiency of a vehicle.

The object is achieved by a method for displaying a representation of a driving pattern of a vehicle, said method comprising determining said driving pattern in the form of a condition involving excess fuel consumption of said vehicle, and displaying a representation of said excess fuel consumption on a display unit in said vehicle. The method furthermore comprises providing first input data related to an actual speed of said vehicle travelling along a route, providing second input data related to a reference speed for said route, calculating, based on said first and second input data, a measure of said excess fuel consumption as a result of said actual speed exceeding said reference speed; and presenting, on said display unit, said representation of the excess fuel consumption.

According to an embodiment, the method comprises: calculating, based on said first and second input data, a reduction in time for travelling on said route at said actual speed as compared with the time for travelling on said route at said reference speed; and presenting, on said display unit, a representation of said reduction in time.

An advantage with this embodiment is that it will provide combined information related to both an actual time gain and an increased fuel cost, which is an advantage compared to previous technology. The fact that both the excess fuel consumption and the reduction in time is displayed to the driver of a vehicle means that the driver will receive relevant information in order to make logic decisions regarding a suitable driving pattern and the choice of speed.

According to an embodiment, information related to said reference speed is provided so as to correspond to optimum fuel economy for said vehicle. According to a first example, the reference speed is determined as the maximum allowed speed on said route. According to a second example, the reference speed is determined in the form of a predetermined speed profile which corresponds to an optimum fuel consumption on said route.

Furthermore, according to an embodiment, any excess fuel consumption is presented as a corresponding monetary value. According to a further embodiment, said excess fuel consumption is presented as a corresponding amount of carbon dioxide. According to a further embodiment, said excess fuel consumption is presented in the form of a corresponding volume of fuel.

Furthermore, according to an embodiment, the measure of excess fuel consumption is calculated at least partly based on fuel consumed during acceleration of said vehicle. According to the embodiment, the excess fuel consumption is calculated as the sum of a constant speed excess consumption and an acceleration excess consumption.

The above-mentioned object is also achieved by means of a system for displaying a representation of a driving pattern of a vehicle, comprising a central processing unit configured for determining said driving pattern in the form of a condition involving excess fuel consumption of said vehicle; and a display unit displaying a representation of said excess fuel consumption. The system further comprises an engine management unit for providing first input data related to an actual speed of said vehicle travelling along a route, a further unit for providing second input data related to a reference speed for said route; wherein said central processing unit is configured for calculating, based on said first and second input data, a measure of said excess fuel consumption as a result of said actual speed exceeding said reference speed; and wherein said display unit is configured for receiving data from said control unit which represents said excess fuel consumption.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
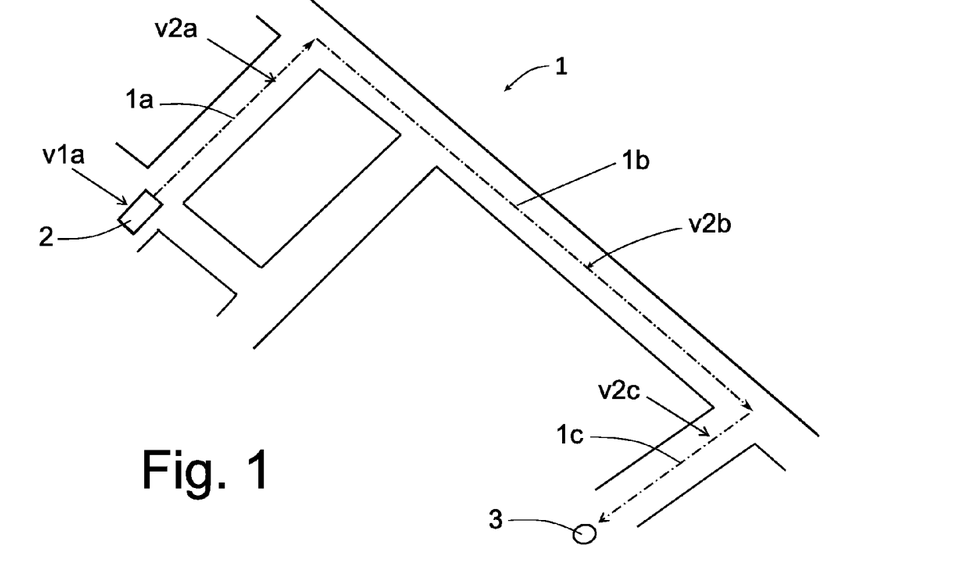
FIG. 1 shows, in order to explain the principles of the disclosure in a simplified manner, a section of a map in which a vehicle may travel.

The disclosure will now be described with reference to different embodiments and the appended drawings. With initial reference to FIG. 1, there is shown a simplified map of a system of roads 1 for vehicle traffic. Furthermore, a vehicle 2 is shown in a position in which it will start a trip along a certain route in the form of a first road segment 1a. Purely as an example, FIG. 1 shows that the first road segment 1a is followed by a second road segment 1b and then by a third road segment 1c.

Consequently, according to this example, the vehicle 2 will first travel along the first road segment 1a, then the second road segment 1b and then finally the third road segment 1c before it reaches its destination, which is schematically indicated by means of reference numeral 3. The direction of travel of the vehicle 2 along each road segment 1a, 1b, 1c is indicated by means of arrows.

The principles of the disclosure are generally applicable to any system or pattern of routes or roads and are also applicable for any form of vehicle. The different road segments 1a, 1b, 1c can be of generally any length. However, in order for the disclosure to be useful, it can be expected that the combined distance involved for travelling along the road segments 1a, 1b, 1c is at least a total of a few kilometers or more. However, the disclosure can be implemented in road systems with any length of the road segments, and any number of road segments.

In order to describe the disclosure, it is assumed that the vehicle 2 travels along the first road segment 1a with a certain actual speed v1a, then travels along the second road segment 1b with a further actual speed v1b, then finally along the third road segment 1c with yet a further actual speed v1c. The actual speed of the vehicle 2 on a particular road segment is not necessarily the same as the speed on another road segment. Also, the actual speed within a particular road segment may vary.

The first road segment 1a is associated with a certain reference velocity v2a which according to a first embodiment is equal to the highest allowed speed on the first road segment 1a. In a similar manner, the second road segment 1b is associated with a second reference speed v2b and the third road segment is associated with a third reference speed v2c. It is common that this highest allowed speed is indicated by means of road signs along a particular road segment.

However, as will be described below, the disclosure is not limited to embodiments in which the reference speed corresponds to the maximum allowed speed for a given road segment. Other forms of determining the reference speed will be described in greater detail below.

The disclosure relates generally to a method and system which is configured for determining and displaying a representation of a driving pattern of the vehicle 2. The term "driving pattern" relates in particular to the manner in which the vehicle 2 is operated by a driver with respect to its fuel consumption. In other words, the term "driving pattern" describes the manner in which a driver operates the vehicle in order to optimize the fuel consumption.

This means that the driving pattern is generally determined by the speed at which the vehicle 2 is travelling along each road segment 1a, 1b, 1c. Other factors, such as for example the manner in which acceleration of the vehicle 2 occurs, can also be taken into account. Such an embodiment will be described in greater detail below.

According to an embodiment of the disclosure, the driving pattern of the vehicle 2 may comprise an excess consumption of fuel due to the vehicle 2 having an actual speed v1 which is higher than the reference speed v2. In practice, this is determined by continuously comparing the actual speed v1 of the vehicle with the reference speed v2 for any given road segment. For example, and with reference to FIG. 1, it can be assumed that the vehicle 2 starts a trip by travelling along the first road segment 1a. This first road segment 1a is associated with a first reference speed v1a, which for example is 50 km/h. As long as the driver maintains an actual speed v1 which does not exceed this reference speed v2, it is assumed that the driving pattern corresponds to a fully optimal fuel economy. However, if the actual speed v1a of the vehicle 2 should become higher than the reference speed v2a, this will be regarded as a driving pattern which corresponds to a non-optimal fuel economy which leads to an excessive fuel consumption, and which consequently also leads to an increased monetary cost for the driver. For each instant that the driver maintains an actual speed which is higher than the reference speed, a value of the excessive fuel consumption and the corresponding cost will be gradually increased. Also, according to the embodiment, this accumulated cost will be displayed to a driver via an instrument panel, as will be described below with reference to FIGS. 2-4.

As will be described in detail below, the vehicle 2 is equipped with a computerized control unit which is configured to measure the actual speed v1 and compare it with a pre-stored reference speed v2. If the actual speed v1 exceeds the reference speed v2, the control unit will calculate an accumulated value of the excess fuel consumption which is related to this non-optimal driving pattern and display this information to the driver of the vehicle 2.

According to a further embodiment of the disclosure, the displayed information related to the increased cost as a result of the excess in fuel consumption can be combined with further displayed information which relates to the reduction in time for travelling as a result of the fact that the actual speed v1 of the vehicle 2 exceeds the reference speed v2. In other words, when the vehicle 2 travels on a particular route with an actual speed v1 which exceeds the reference speed v2, it can be calculated how much time is gained for the driver of the vehicle 2, as compared with a condition in which the vehicle speed v1 does not exceed the reference speed v2. This information leads to an advantage, since it gives the driver a useful feedback on the current driving style, answering the two questions "how much time have I saved by driving faster than the reference speed?" and "how much extra cost in excessive and unavoidable fuel consumption has been the consequence of driving faster than the reference speed?" Such information can be useful for a driver in order to make well-founded and clear decision based on fuel cost, available travel time and environmental impact due to increased fuel consumption.

Figure 2:
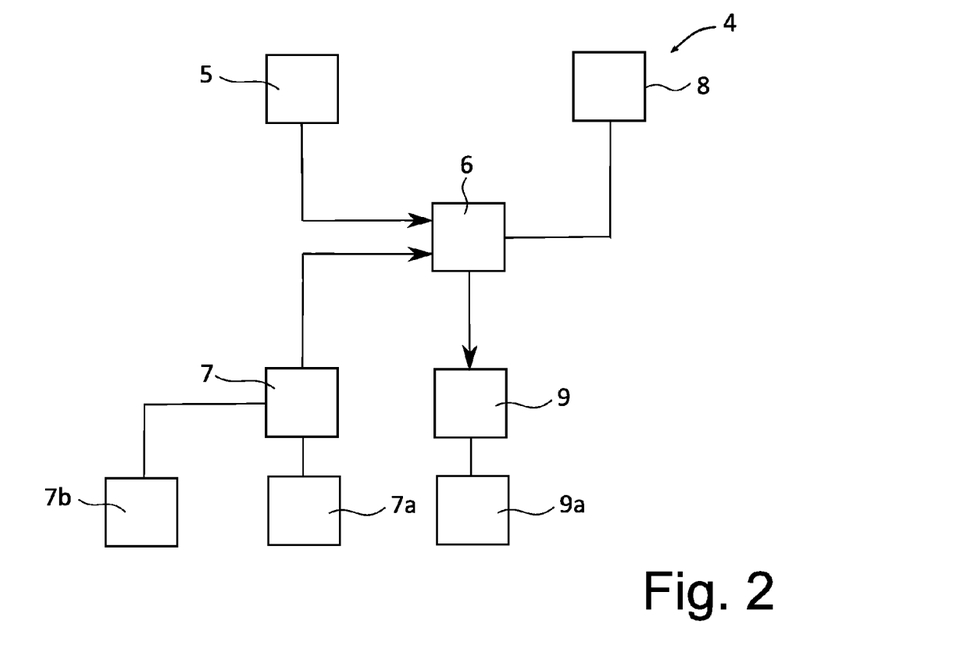
FIG. 2 shows a system by means of which the disclosure can be implemented.

With reference to FIG. 2, there is shown a schedule of a computerized control system 4 which is configured for implementing the disclosure. According to an embodiment, the control system 4 is arranged in the vehicle 2 and is based on the use of an engine management system (EMS) 5. The engine management system 5 is a computer-based control unit which is generally known as such and arranged for controlling the performance of a vehicle's engine by means of input data from a number of sensors and through the use of actuators associated with the engine and other vehicle components. For example, parameters such as the air/fuel mixture and the timing of the engine ignition timing are controlled by the engine management system 5.

The engine management system 5 is further connected to a central processing unit (CPU) 6 and is arranged for transferring data to said central processing unit 6 which relates at least to the actual vehicle speed v1, but also further data regarding which gear is selected in the vehicle 2 and the current fuel consumption in the vehicle 2. The central processing unit 6 is also supplied with input data from a further unit 7, suitably in the form of a navigation unit 7, which provides information related to the current position of the vehicle 2 and also to the reference speed v2. In a first embodiment, the reference speed v2 is constituted by a maximum allowed speed on the specific road segment where the vehicle 2 is currently travelling. Information related to the position of the vehicle 2 can then be provided by means of a location receiver 7a which is associated with the navigation unit 7 and which is configured to provide navigational data (latitude and longitude) by cooperating with a navigation system such as the commonly used GPS system (Global Positioning System). The engine management system and/or the central processing unit may comprise one or more processors and associated memory which may store computer executable instructions that control operation of the energy management system and/or the central processing unit and/or for performing the various operations and/or functions described herein.

Through the use of information related to the position of the vehicle 2, the reference speed v2 can be determined for each road segment, by using available information which indicates which maximum speed is associated with a certain road segment.

According to a further embodiment, the reference speed v2 can be determined through the use of a camera 7b arranged in the vehicle 2 and configured for detecting the presence of road signs (not shown in the drawings) along the road segments on which the vehicle 2 is travelling. In this manner, the navigation unit 7 can be configured for detecting the speed limits indicated on such road signs. This is implemented by means of image processing software which is used for treating video or image signals from said camera 7b.

According to a third embodiment, the reference speed v2 can be implemented in the form of a speed profile which can be applied to any road segment, or combination of road segments, or part of a road segment. The speed profile is implemented by determining which specific speed is most optimal from a fuel efficiency point of view for any given road segment. Such a reference speed profile can then be stored in the navigation unit 7 and can be used for comparing with the actual speed v1 as the vehicle 2 travels along a certain road segment as described above. The reference speed for each road segment in this speed profile may or may not be the same as the maximum allowed speed as indicated by the road signs.

Furthermore, the central processing unit 6 is connected to a memory unit 8, which is configured for storing data at least related to the fuel consumption of the vehicle 2, i.e. tables which indicate a nominal fuel consumption corresponding to a given actual speed v1. Such tables are suitably arranged so that the value of the nominal fuel consumption depends not only on the actual speed v1 of the vehicle 2 but also on the gear which is currently selected in the vehicle 2. Furthermore, information regarding the nominal fuel consumption of the vehicle 2 can be provided in alternative ways, for example by downloading such information via the internet, or by allowing a driver of the vehicle 2 to manually input data which indicates the fuel consumption as a function of the actual speed v1.

Also, the central processing unit 6 is connected to a display unit 9, which is configured for presenting a measure of the increase in fuel consumption, suitably in the form of a monetary value indicating the actual fuel cost as a result of the excessive speed. Consequently, the information is shown in a manner telling the driver how much money it will cost due to a driving pattern in which the actual speed v1 exceeds the reference speed v2. The information regarding the increased fuel consumption can, according to alternative embodiments, instead be displayed in the form of an amount of increased carbon dioxide ($CO_2$) emissions or alternatively in the form of the actual increased fuel consumption, in liters or milliliters.

According to an embodiment, the control unit 6 is arranged not only for displaying a value of the excess fuel consumption but also for displaying a value of the reduction in time which is gained by the driver as a result of the excessive speed. For example, if the vehicle 2 is travelling a distance of 10 kilometers along a road segment with an actual speed of 110 km/h and where the reference speed is 100 km/h, it can be calculated that for this distance, the reduction in time as a result of this excess speed will be approximately 33 seconds. The excess speed will also result in an increased fuel consumption, as explained above. The control unit 6 is configured to determine the fuel consumption depending on the actual speed v1 for each given gear. These values are taken from a pre-stored table which contains nominal fuel consumption values as a function of vehicle speed. Also, one such table for each chosen gear is provided and used for determining the fuel consumption.

According to an embodiment, the excess fuel consumption is calculated as the sum of two parameters, i.e. the sum of the excess fuel consumption being dependent on vehicle speed and selected gear (as explained above) during generally constant speed, and a further parameter in the form of a measured fuel consumption during acceleration. More precisely, it has been found that a driving pattern involving frequent acceleration and braking will also influence the amount of fuel which is consumed. This means that when the actual speed v1 exceeds the reference speed v2, the total excess fuel consumption will be calculated by the sum of the constant speed excess consumption and the acceleration excess consumption, as integrated along a particular road segment and during a particular time period. This can be expressed according to the following:

$$EFC = \int (CSEC + AEC) dt$$

wherein:

$$CSEC = FCLT(v1) - FCLT(v2); \text{ where}$$

$FCLT(v1)$=the nominal fuel consumption at actual speed (v1), and
$FCLT(v2)$=the nominal fuel consumption at reference speed (v2);
and wherein $$AEC = FC - FCLT(v1), \text{ where}$$

FC=the momentary fuel consumption during acceleration as obtained by the engine management system 5.

The AEC component of the total fuel consumption is added on the condition that the acceleration of the vehicle 2 exceeds a predetermined threshold value.

It should be noted that it is preferred that the nominal fuel consumption is taken into account when calculating the constant speed excess consumption, i.e. as opposed to the actual, i.e. "true", fuel consumption. This is due to the fact that influences such as wind, road elevation profile and the condition of the vehicle tires should not be taken into account when calculating the constant speed excess consumption.

Figure 3:
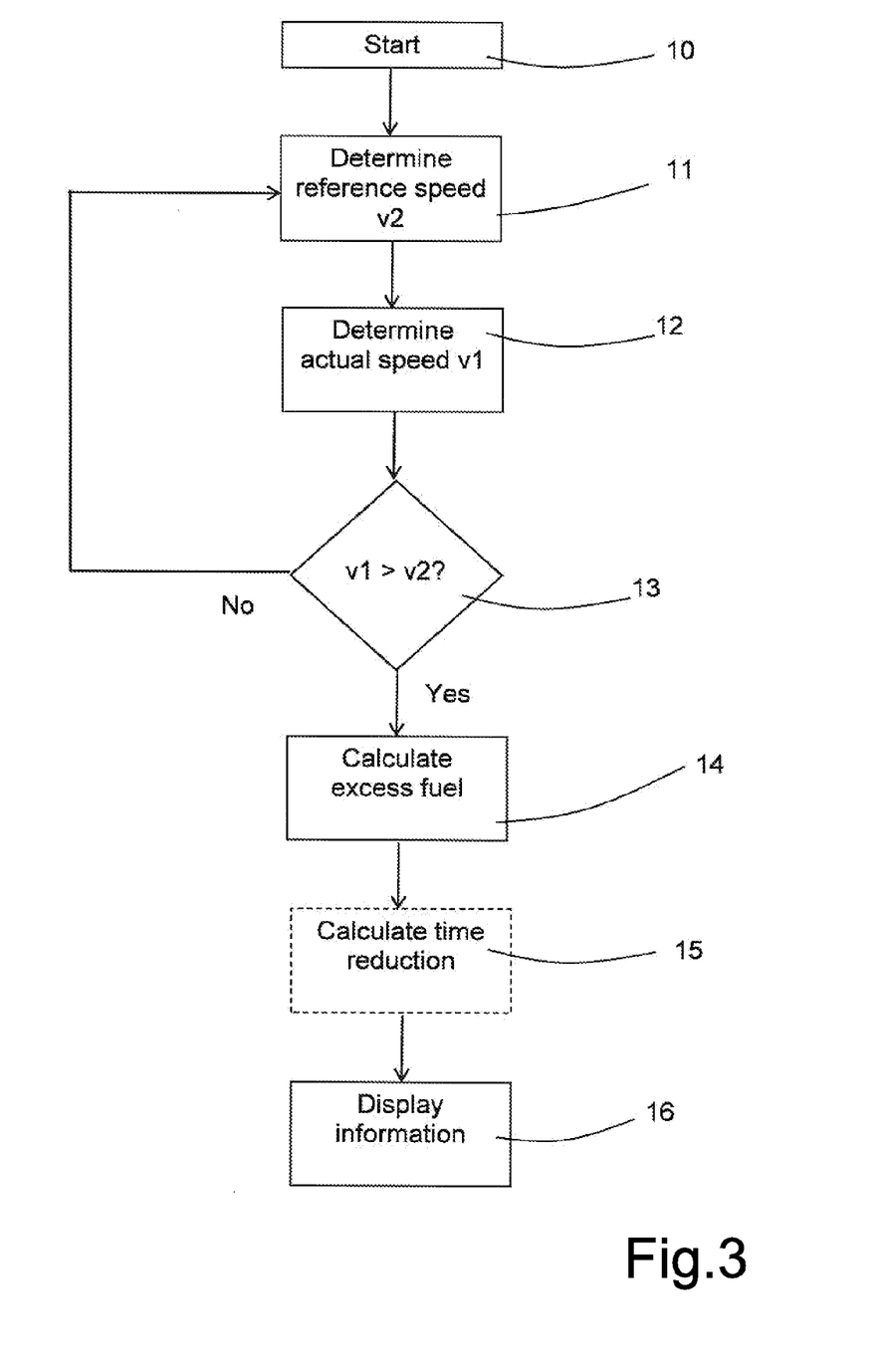
FIG. 3 is a flow chart describing the method according to the disclosure.

Referring to FIG. 3, which is a flow chart showing in a simplified way the principles of the disclosure in a number of method steps, it can be noted that after the vehicle 2 has started a trip (see step 10 in FIG. 4), the reference speed v2 is determined (step 11). This can be carried out in either one of the methods as explained above. Furthermore, the actual speed v1 of the vehicle 2 is determined by means of the engine management system 5 (step 12). Data related to the reference speed v2 and the actual speed v1 is fed to the control unit 6 in order to compare whether the actual speed v1 is currently higher than the reference speed v2 (step 13). If this is the case, this will be regarded as a driving pattern of the driver of the vehicle 2 involving an excess fuel consumption. This means that the control unit 6 will calculate the excess fuel consumption according to the above-mentioned principles (step 14). The additional fuel consumption due to any acceleration of the vehicle 2 is also added at this stage, i.e. the total excess fuel consumption EFC as explained above will be calculated.

According to an embodiment, the control unit 6 will also calculate the reduction in time which is obtained by the driver of the vehicle 2 as a result of the actual speed exceeding the reference speed (step 15). Finally, the control unit 6 will send output data to the display unit 9 so that an indication of the increased cost as a result of the excess fuel consumption can be presented to the driver of the vehicle 2 (step 16). Optionally, the control unit 6 can also send output data to the display unit 9 so that an indication of the reduction in time for the driver to reach the destination (as compared with driving at the reference speed) can be presented to the driver. An indicator 9a for displaying said information will be described in greater detail below with reference to FIG. 4.

According to an embodiment, there is consequently presented a combined set of information to the driver, i.e. in the form both of information related to the cost for the excess fuel consumption and also the reduced time which is obtained as a result of the fact that the actual speed v1 exceeds the reference speed v2. More precisely, for each part of each road segment where the reference speed v2 is exceeded by the vehicle 2, there will both be an excess in fuel consumption and also a certain time gain, i.e. a reduced time for travelling a specific distance as compared with the time it takes for travelling the same distance but at the reference speed v2. This combined information is useful for the driver in order to make balanced and well-founded decisions regarding the speed which is chosen at a particular road segment. The driver will get an answer to the question: "how much will it cost to save time?" which can be useful. In some situations, people may have a tendency to believe that the reduction in time due to an excessive speed is higher than it actually is, and the present disclosure provides a way of obtaining more precise and clear answers to this question.

Figure 4:
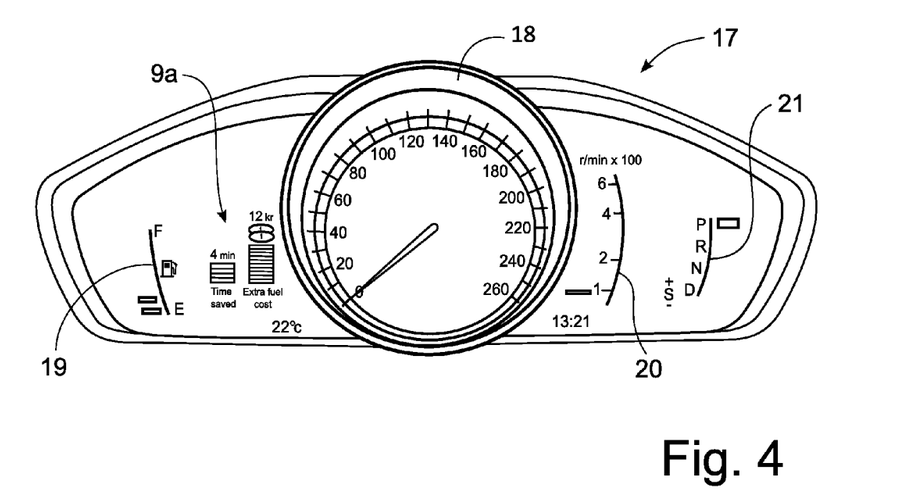
FIG. 4 shows a display unit by means of which the disclosure can be implemented.

FIG. 4 discloses an instrument panel 17 including a number of instruments, indicators and gauges, such as for example a speedometer 18, a fuel gauge 19, a tachometer 20 and a gear selector indicator 21. Also, a combined indicator 9a which forms part of the display unit 9 as mentioned above is provided in the instrument panel 17. The indicator 9a is suitably arranged as two indicator columns, i.e. one column for indicating the increased cost due to the excess speed and a further column for indicating the reduction in time which is obtained.

It should be noted that there is no reduction of the accumulated fuel consumption during driving in a condition in which the actual speed v1 becomes lower than the reference speed v2. The logic behind this is that when the vehicle 2 is travelling at a relatively low speed, i.e. lower than the reference speed v2, this can be the result of different causes such as heavily congested traffic or roadwork, which forces the driver to drive slowly. It is believed that these factors should not be credited to the driver as being particularly environmental-friendly, since it may not be a decision by the driver to drive so slowly.

Figure 5:
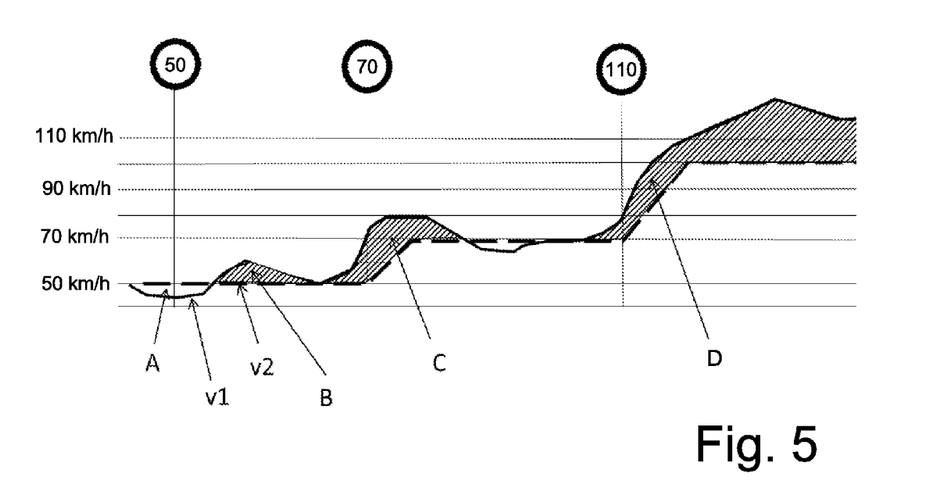
FIG. 5 is a chart which further explains the operation of the disclosure.

FIG. 5 is a simplified graph showing a typical pattern of driving and showing the principles of the disclosure. The continuous line in FIG. 5 corresponds to the actual speed v1 of the vehicle whereas the broken line corresponds to the reference speed v2. It should be noted that the driving pattern and road segments described with reference to FIG. 5 does not correspond to the actual system of roads shown in FIG. 1.

The first road segment traveled by the vehicle as shown in FIG. 4 has a reference speed of 50 km/h. During a first stage, indicated with reference letter A in FIG. 4, the vehicle travels with an actual speed v1 which is lower than the reference speed v2. However, during a second stage B, the speed increases and exceeds the reference speed v2. This means that during this stage B, there will be an excess fuel consumption, the magnitude of which is calculated as the sum of a constant speed excess consumption and an acceleration excess consumption, i.e.

$$EFC=\int(CSEC+AEC)dt$$

according to the principles described above. Along with the gradually increasing amount of excess fuel, the indicator 9a (cf. FIG. 4) will show the added cost for the excess speed and also the reduction in time for travelling due to the excess speed.

As shown in FIG. 5, the vehicle enters a road segment having a higher reference speed, i.e. 70 km/h, where the vehicle still has an actual speed v1 which is higher than the reference speed v2. It can be noted that the curve defining the reference speed v2 in FIG. 5 takes into consideration an initial phase in which the vehicle may accelerate from 50 km/h to 70 km/h. During a stage C, a certain amount of excess fuel is also determined according to the principles described above. Purely as an example, it could be the case that the excess fuel consumption could be 0.2 liters and the reduction in time 15 seconds during stage C. Finally, the vehicle enters a further stage D, with a reference speed v2 of 110 km/h in which the actual vehicle speed v1 is also higher than said reference speed v2. This obviously means that the gradually increasing excess fuel consumption and reduction in time is continuously shown by means of the indicator 9a.

The disclosure can be applied in different types of vehicles, such as passenger cars, commercial vehicles such as trucks and buses, and also motorcycles and other road vehicles. The disclosure can also be implemented in various types of watercraft and aircraft, i.e. it is not limited to vehicles adapted for road traffic. This means that the term "route" as used above is not limited to roads for road vehicles but can be regarded as also comprising for example water routes and air traffic routes.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for displaying a representation of a driving pattern of a vehicle, the method comprising:
   determining the driving pattern in the form of a condition involving excess fuel consumption of the vehicle;
   displaying a representation of the excess fuel consumption on a display unit in the vehicle;
   providing first input data related to an actual speed of the vehicle travelling along a route;
   providing second input data related to a reference speed for the route;
   calculating, based on the first and second input data, a measure of the excess fuel consumption as a result of the actual speed exceeding the reference speed; and
   presenting, on the display unit, the representation of the excess fuel consumption.

2. The method according to claim 1 further comprising:
   calculating, based on the first and second input data, a reduction in time for travelling on the route at the actual speed as compared with the time for travelling on the route at the reference speed; and
   presenting, on the display unit, a representation of the reduction in time.

3. The method according to claim 1 further comprising providing information related to the reference speed in the form of a value which corresponds to optimum fuel economy for the vehicle.

4. The method according to claim 1 further comprising calculating the measure of excess fuel consumption at least partly based on fuel consumed during acceleration of the vehicle.

5. The method according to claim 4 further comprising calculating the measure of excess fuel consumption (EFC) as the sum of a constant speed excess consumption (CSEC) and an acceleration excess consumption (AEC), as integrated during a given time period, wherein $$CSEC=FCLT(v1)-FCLT(v2),$$

where FCLT(v1)=the nominal fuel consumption at actual speed (v1), and FCLT(v2)=the nominal consumption at reference speed (v2), and wherein $$AEC=FC-FCLT(v1),$$

where FC=the momentary fuel consumption during acceleration.

6. The method according to claim 1 further comprising presenting, on the display unit, the representation of the excess fuel consumption in the form of a corresponding monetary value.

7. The method according to claim 1 further comprising presenting, on the display unit, the representation of the excess fuel consumption in the form of a corresponding amount of carbon dioxide.

8. The method according to claim 1 further comprising presenting, on the display unit, the representation of the excess fuel consumption in the form of a corresponding volume of fuel.

9. The method according to claim 1 further comprising determining the reference speed as the maximum allowed speed on the route.

10. The method according to claim 1 further comprising determining the reference speed as a predetermined speed profile determined so as to correspond to an optimum fuel consumption on the route.

11. A system for displaying a representation of a driving pattern of a vehicle, the system comprising:
   a central processing unit configured for determining the driving pattern in the form of a condition involving excess fuel consumption of the vehicle;
   a display unit for displaying a representation of the excess fuel consumption;
   an engine management unit for providing first input data related to an actual speed of the vehicle travelling along a route; and
   a further unit for providing second input data related to a reference speed for the route;
   wherein the central processing unit is configured for calculating, based on the first and second input data, a measure of the excess fuel consumption as a result of the actual speed exceeding the reference speed, and the display unit is configured for receiving data from the control unit which represents the excess fuel consumption.

12. The system according to claim 11 wherein the central processing unit is configured for calculating, based on the first and second input data, a measure of a reduction in time for travelling on the route at the actual speed as compared with the time for travelling on the route at the reference speed, and wherein the display unit is configured for indicating a representation of the reduction in time.

13. A vehicle comprising the system according to claim 11.

14. A central processing unit for use in displaying a representation of a driving pattern of a vehicle, the central processing unit configured to:
- determine the driving pattern in the form of a condition involving excess fuel consumption of the vehicle;
- receive first input data related to an actual speed of the vehicle travelling along a route;
- receive second input data related to a reference speed for the route;
- calculate, based on the first and second input data, a measure of the excess fuel consumption as a result of the actual speed exceeding the reference speed; and
- provide data to present, on a display unit, a representation of the excess fuel consumption.

\* \* \* \* \*